United States Patent
Harada et al.

(10) Patent No.: US 9,174,598 B2
(45) Date of Patent: Nov. 3, 2015

(54) COLLISION PREDICTION DEVICE

(75) Inventors: Tomoaki Harada, Susono (JP); Hisashi Satonaka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 794 days.

(21) Appl. No.: 12/440,754

(22) PCT Filed: Feb. 26, 2008

(86) PCT No.: PCT/JP2008/053727
§ 371 (c)(1),
(2), (4) Date: Mar. 11, 2009

(87) PCT Pub. No.: WO2008/105554
PCT Pub. Date: Sep. 4, 2008

(65) Prior Publication Data
US 2010/0042323 A1    Feb. 18, 2010

(30) Foreign Application Priority Data
Feb. 28, 2007  (JP) ................................ 2007-050088

(51) Int. Cl.
*G05D 1/02*  (2006.01)
*B60R 21/0134*  (2006.01)
(Continued)

(52) U.S. Cl.
CPC ............ *B60R 21/0134* (2013.01); *B60W 30/08* (2013.01); *B60R 2021/0006* (2013.01); *B60R 2021/01304* (2013.01);
(Continued)

(58) Field of Classification Search
CPC ................................................. B60R 21/0134
USPC ............................................. 701/300; 342/70
See application file for complete search history.

(56) References Cited

U.S. PATENT DOCUMENTS 5,936,549 A    8/1999  Tsuchiya
6,529,831 B1 *  3/2003  Smith et al. ................... 701/301
(Continued)

FOREIGN PATENT DOCUMENTS

JP    A-10-59120    3/1998
JP    A-2002-140799    5/2002
(Continued)

OTHER PUBLICATIONS

European Search Report issued Jun. 1, 2010 in European Patent Application No. 08 72 1147.0.

*Primary Examiner* — Robert Sorey
(74) *Attorney, Agent, or Firm* — Oliff PLC

(57) ABSTRACT

In a collision surface determination computing section 27, a collision prediction ECU 2 selects a surface of an own vehicle where an opponent vehicle collides when the own vehicle and opponent vehicle collide with each other. A vehicle track intersection computing section 29 calculates an intersection between the own vehicle and the opponent vehicle. According to the intersection between the own vehicle and opponent vehicle and respective times when the own vehicle and opponent vehicle reach the intersection, a collision determining section 30 determines whether the own vehicle and opponent vehicle collide with each other or not. When it is determined that the own vehicle and opponent vehicle collide with each other, a collision position computing section 32 calculates a collision position of the own vehicle where the opponent vehicle collides according to the collision surface selected in the collision surface determination computing section 27.

8 Claims, 15 Drawing Sheets

(51) Int. Cl.
*B60W 30/08* (2012.01)
*B60R 21/00* (2006.01)
*B60R 21/013* (2006.01)
*B60R 21/0132* (2006.01)
*G01S 13/93* (2006.01)

(52) U.S. Cl.
CPC .... *B60R 2021/01327* (2013.01); *G01S 13/931* (2013.01); *G01S 2013/9346* (2013.01); *G01S 2013/9353* (2013.01); *G01S 2013/9375* (2013.01); *G01S 2013/9378* (2013.01)

(56) References Cited

U.S. PATENT DOCUMENTS

| | | | |
|---|---|---|---|
| 6,628,227 B1 | 9/2003 | Rao et al. | |
| 6,826,479 B2* | 11/2004 | Miyahara | 701/301 |
| 7,650,239 B2* | 1/2010 | Samukawa et al. | 701/300 |
| 7,797,107 B2* | 9/2010 | Shiller | 701/301 |
| 7,805,321 B2* | 9/2010 | Wahlbin et al. | 705/4 |
| 2001/0020201 A1* | 9/2001 | Shirai et al. | 701/1 |
| 2003/0188908 A1 | 10/2003 | Abe | |
| 2004/0019420 A1 | 1/2004 | Rao et al. | |
| 2004/0117091 A1* | 6/2004 | Prakah-Asante et al. | 701/45 |
| 2005/0093735 A1* | 5/2005 | Samukawa et al. | 342/70 |
| 2005/0243301 A1* | 11/2005 | Takagi | 356/4.07 |
| 2007/0043502 A1* | 2/2007 | Mudalige et al. | 701/207 |
| 2007/0129891 A1* | 6/2007 | Yano et al. | 701/301 |
| 2009/0076702 A1* | 3/2009 | Arbitmann et al. | 701/96 |
| 2009/0143951 A1* | 6/2009 | Takahashi et al. | 701/70 |
| 2009/0299576 A1* | 12/2009 | Baumann et al. | 701/45 |

FOREIGN PATENT DOCUMENTS

| | | |
|---|---|---|
| JP | A-2004-1591 | 1/2004 |
| JP | A-2005-254945 | 9/2005 |
| JP | A-2006-99715 | 4/2006 |
| JP | A 2006-131092 | 5/2006 |
| JP | A-2007-34684 | 2/2007 |
| JP | A-2007-210563 | 8/2007 |

* cited by examiner

_US 9,174,598 B2_

COLLISION PREDICTION DEVICE

TECHNICAL FIELD

The present invention relates to a collision prediction apparatus for predicting a collision position of an own vehicle with a collision candidate moving body such as another vehicle.

BACKGROUND ART

Passenger protection apparatus equipped with seatbelts and the like for protecting passengers when vehicles collide have been known in conventional vehicles. The passenger protection apparatus include those predicting the collisions in order to appropriately protect the passengers according to timings of the vehicles, collision positions, and the like. As such a passenger protection apparatus carrying out a collision prediction, one which detects a vehicle entering an intersection, predicts a collision, and controls a vehicle such as to make it decelerate or stop when there is a possibility of colliding has conventionally been known (e.g., Japanese Patent Application Laid-Open No. 2002-140799).

DISCLOSURE OF INVENTION

However, the collision prediction disclosed in the above-mentioned Japanese Patent Application Laid-Open No. 2002-140799 may adversely increase the impact at the time of a collision by uniformly controlling the vehicle to make it decelerate or stop when the collision is predicted. Therefore, respective collision determining operations may be carried out for the cases of colliding with vehicles from the left and right sides, so as to estimate collision positions. Here, for predicting collisions, determination of collisions with vehicles in all the directions and premeasurement of their positions are carried out. This has been problematic in that the amount of computations is so enormous that the computational load becomes higher.

It is therefore an object of the present invention to provide a collision prediction apparatus aiming at reducing the computational load when predicting a collision position of a vehicle.

The collision prediction apparatus having achieved the above-mentioned object comprises running track prediction means for predicting a running track of an own vehicle, positional relationship detection means for detecting a relative positional relationship between a collision candidate moving body and the own vehicle, collision position calculation means for calculating a collision position of the own vehicle with the collision candidate moving body according to the predicted running track and the relative positional relationship, collision direction prediction means for predicting a collision direction of the collision candidate moving body with respect to the own vehicle, and collision surface selection means for selecting a collision surface of the own vehicle with the collision candidate moving body according to the predicted collision direction of the collision candidate moving body with respect to the own vehicle; wherein the collision position calculation means calculates the collision position with the collision candidate moving body according to the selected collision surface.

The collision prediction apparatus in accordance with the present invention predicts a collision surface of the own vehicle with a collision candidate moving body when carrying out collision detection. Therefore, the amount of computations at the time of colliding with the collision candidate moving body can be made much smaller than that when the collision candidate moving body is assumed to collide at any position in the own vehicle as a whole. Hence, when predicting the collision position of the vehicle, the computational load can be reduced.

Here, the collision direction prediction means may predict the collision direction according to a left/right position of the collision candidate moving body with respect to the ruing track of the own vehicle.

Thus predicting the collision direction according to the left/right position of the collision candidate moving body with respect to the running track of the own vehicle can easily specify the collision surface.

The apparatus may further comprise first time calculation means for calculating a first time when the own vehicle reaches an intersection between the selected collision surface and a running track of the collision candidate moving body, second time calculation means for calculating a second time when the own vehicle passes the intersection between the selected collision surface and the running track of the collision candidate moving body, and third time calculation means for calculating a third time when the collision candidate moving body reaches the intersection between the selected collision surface and the running track of the collision candidate moving body; wherein the third time is taken as a predicted collision time when the third time is later than the first time but earlier than the second time, and the collision position is predicted according to the predicted collision time.

The apparatus may further comprise fourth time calculation means for calculating a fourth time when the own vehicle reaches an intersection between the selected collision surface and a running track of the collision candidate moving body, fifth time calculation means for calculating a fifth time when the collision candidate moving body reaches the intersection between the selected collision surface and the running track of the collision candidate moving body, and sixth time calculation means for calculating a sixth time when the collision candidate moving body passes the intersection between the selected collision surface and the running track of the collision candidate moving body; wherein the fourth time is taken as a predicted collision time when the fourth time is later than the fifth time but earlier than the sixth time, and the collision position is predicted according to the predicted collision time.

Thus comparing times for reaching the intersection between the own vehicle and collision candidate moving body can easily calculate the collision position.

Further scope of applicability of the present invention will become apparent from the detailed description given hereinafter. However, it should be understood that the detailed description and specific examples, while indicating preferred embodiments of the present invention, are given by illustration only, since various changes and modifications within the spirit and scope of the invention will become apparent to those skilled in the art from this detailed description.

DESCRIPTION OF EMBODIMENTS

Figure 1:
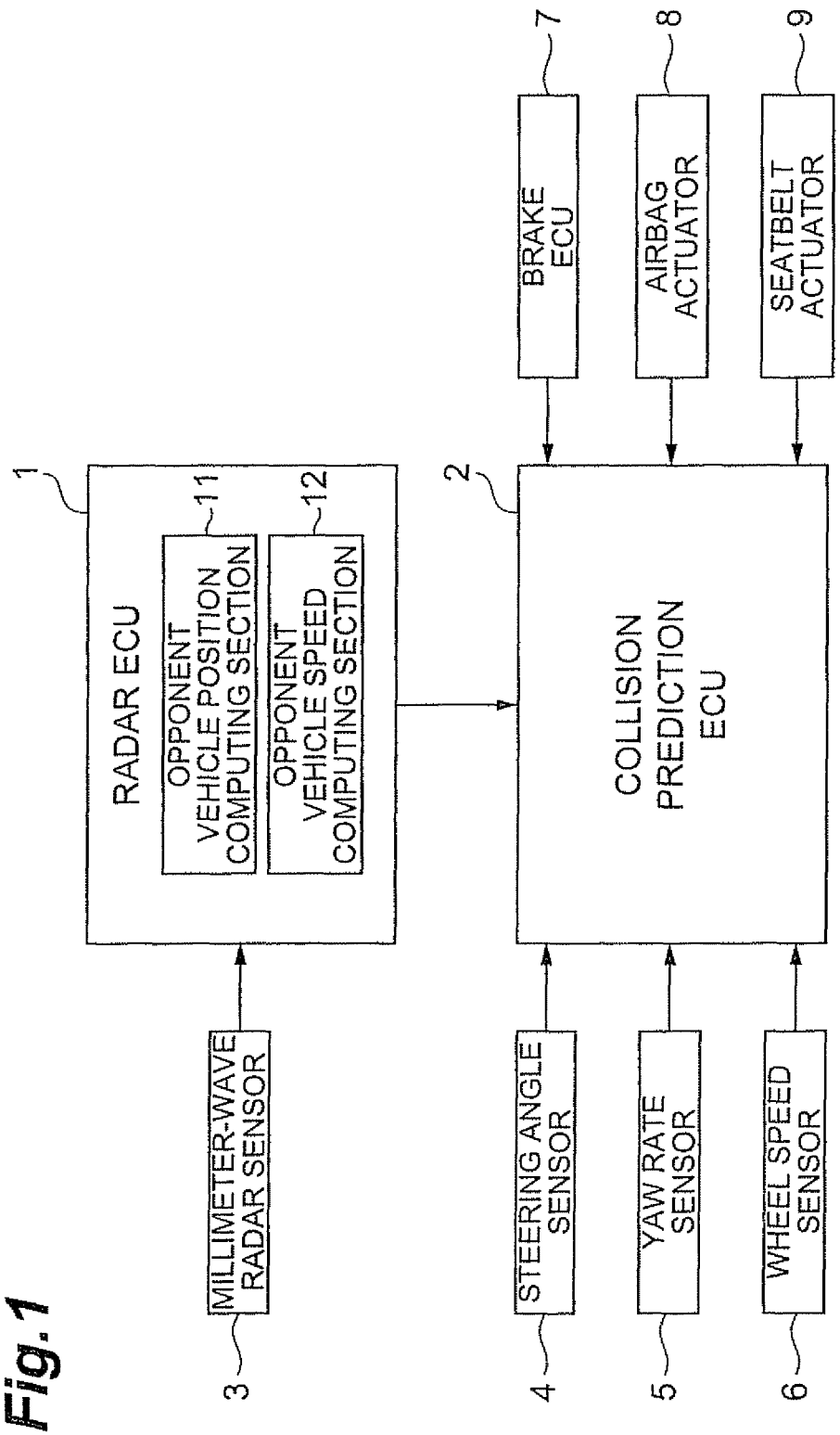
FIG. 1 is a block diagram illustrating the structure of a collision prediction apparatus in accordance with the present invention.

In the following, embodiments of the present invention will be explained with reference to the accompanying drawings. In the explanation of the drawings, the same constituents will be referred to with the same signs while omitting their overlapping descriptions. For convenience of illustration, ratios of dimensions in the drawings do not always coincide with those explained.

FIG. 1 is a block diagram illustrating the structure of a collision prediction apparatus in accordance with the present invention. As illustrated in FIG. 1, the collision prediction apparatus comprises a radar ECU 1 and a collision prediction ECU 2. The radar ECU 1, a steering angle sensor 4, a yaw rate sensor 5, and a wheel speed sensor 6 are connected to the collision prediction ECU 2. A brake ECU 7, an airbag actuator 8, and a seatbelt actuator 9 are also connected to the collision prediction ECU 2.

Figure 2:
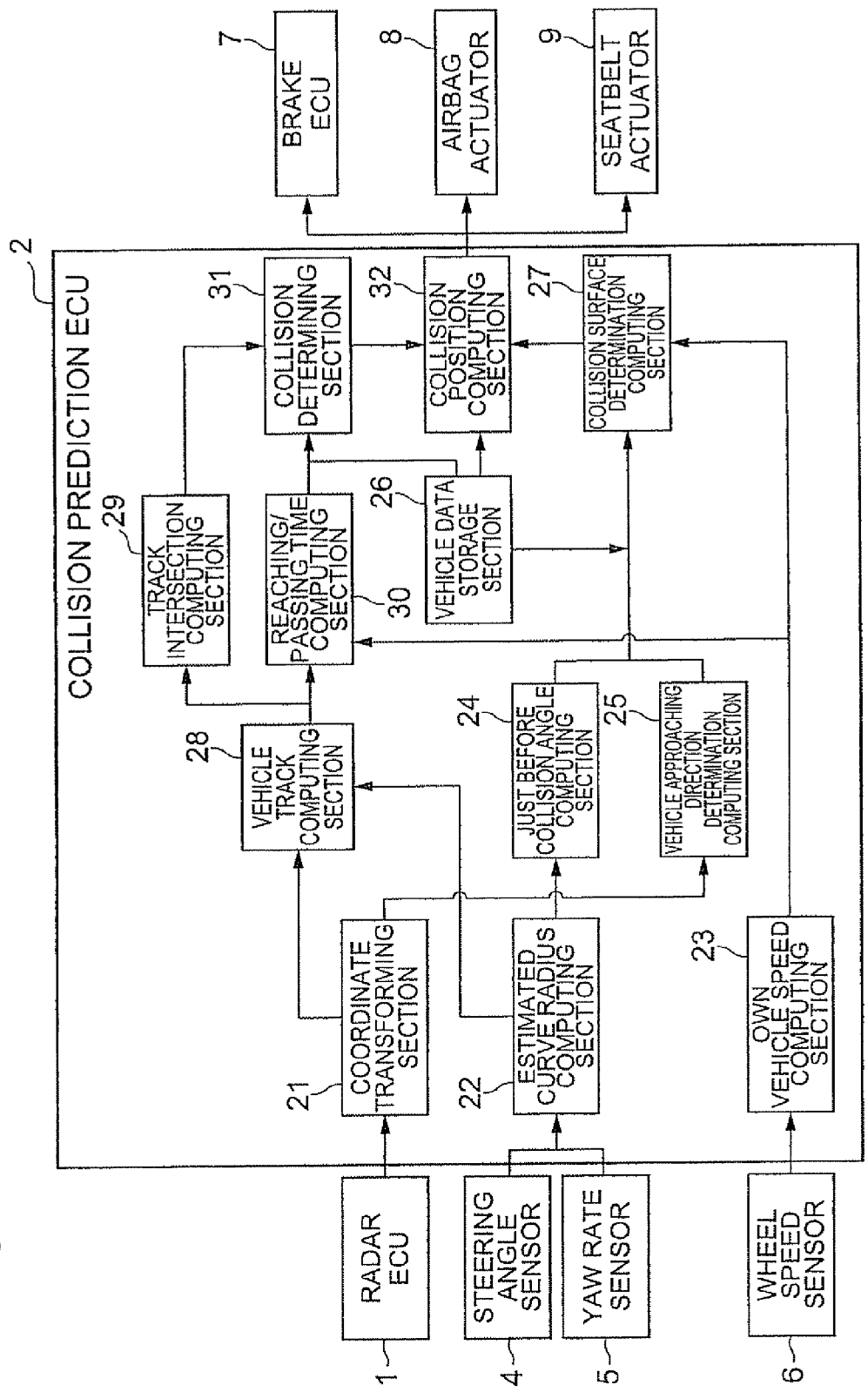
FIG. 2 is a block diagram of a collision prediction ECU.

Each of the radar ECU 1 and collision prediction ECU 2, which are electronically controlled automobile device computers, is constituted by a CPU (Central Processing Unit), a ROM (Read Only Memory), a RAM (Random Access Memory), an I/O interface, and the like. The radar ECU 1 comprises an opponent vehicle position computing section 11 and an opponent vehicle speed computing section 12. As illustrated in FIG. 2, the collision prediction ECU 2 comprises a coordinate transforming section 21, an estimated curve radius computing section 22, an own vehicle speed computing section 23, a just before collision angle computing section 24, a vehicle approaching direction determination computing section 25, and a vehicle data storage section 26. The collision prediction ECU 2 further comprises a collision surface determination computing section 27, a vehicle track computing section 28, a track intersection computing section 29, a reaching/passing time computing section 30, a collision determining section 31, and a collision position computing section 32.

Millimeter-wave radar sensors 3 are attached to a vehicle at the front grille and the cover part of the rear bunk, for example, so as to emit millimeter waves forward and sideways, respectively, and receive their reflected waves. The millimeter-wave sensors 3 output a reflected wave signal concerning the received reflected waves to the radar ECU 1. The steering angle sensor 4 is attached to the steering rod of the vehicle, for example, and detects the steering angle of the steering wheel operated by the driver. The steering angle sensor 4 outputs a steering angle signal concerning the detected steering angle to the collision prediction ECU 2.

The yaw rate sensor 5 is provided at the center position of the vehicle body, for example, and detects the yaw rate applied to the vehicle body. The yaw rate sensor 5 outputs a yaw rate signal concerning the detected yaw rate to the collision prediction ECU 2. The wheel speed sensor 6 is attached to a wheel part of the vehicle, for example, and detects the wheel speed of the vehicle. The wheel speed sensor 6 outputs a wheel speed signal concerning the detected wheel speed to the collision prediction ECU 2.

According to a deceleration signal issued from the collision prediction ECU 2, the brake ECU 7 outputs a target hydraulic signal to a brake actuator for adjusting the hydraulic pressure of a wheel cylinder. The output of the target hydraulic signal regulates the brake actuator, so as to adjust the hydraulic pressure of the wheel cylinder, thereby controlling the deceleration of the own vehicle.

According to an actuation signal issued from the collision prediction ECU 2, the seatbelt actuator 8 actuates a seatbelt take-up device, so as to take up and tighten a seatbelt. According to an actuation signal issued from the collision prediction ECU 2, the airbag actuator 9 actuates an inflator, so as to unfold a side airbag.

According to the reflected wave signal issued from the millimeter-wave sensors 3, the opponent vehicle position computing section 11 in the radar ECU 1 calculates by a computation the position of an opponent vehicle that is a collision candidate moving body. According to the reflected wave signal issued from the millimeter-wave sensors 3, the opponent vehicle speed computing section 12 calculates by a computation the position and vehicle speed of the opponent vehicle to become a collision candidate. The radar ECU 1 outputs an opponent vehicle signal concerning the position and vehicle speed of the opponent vehicle to the collision prediction ECU 2.

According to the opponent vehicle signal issued from the radar ECU 1, the coordinate transforming section 21 in the collision prediction ECU 2 transforms the position of the opponent vehicle into a coordinate position based on the own vehicle position. The coordinate transforming section 21 outputs a transformed opponent vehicle signal concerning the transformed opponent vehicle position and the opponent vehicle speed to the just before collision angle computing section 24, vehicle approaching direction determination computing section 25, and vehicle track computing section 28.

According to the steering angle signal issued from the steering angle sensor 4 and the yaw rate signal issued from the yaw rate sensor 5, the estimated curve radius computing section 22 calculates by a computation an estimated curve radius of the own vehicle. The estimated curve radius computing section 22 outputs an estimated curve radius signal concerning the calculated estimated curve radius to the just before collision angle computing section 24, vehicle approaching direction determination computing section 25, and vehicle track computing section 28.

According to the wheel speed signal issued from the wheel speed sensor 6, the own vehicle speed computing section 23 calculates the own vehicle speed by a computation. The own vehicle speed computing section 23 outputs a vehicle speed signal concerning the calculated own vehicle speed to the collision surface determination computing section 27 and reaching/passing time computing section 30.

According to the transformed opponent vehicle signal issued from the coordinate transforming section 21 and the estimated curve radius signal issued from the estimated curve radius computing section 22, the just before collision angle computing section 24 calculates by a computation a just before collision angle which is a collision angle just before the opponent vehicle collides with the own vehicle. The just before collision angle computing section 24 outputs a just before collision angle signal concerning the calculated just before collision angle to the collision surface determination computing section 27.

According to the transformed opponent vehicle signal issued from the coordinate transforming section 21 and the estimated curve radius signal issued from the estimated curve radius computing section 22, the vehicle approaching direction determination computing section 25 determines by a computation whether the opponent vehicle approaches from the left or right of the own vehicle when approaching the own vehicle (whether the approaching direction is left or right). The vehicle approaching direction determination computing section 25 outputs an approaching direction signal concerning the determined approaching direction to the collision surface determination computing section 27. The vehicle approaching direction determination computing section 25 constitutes collision direction prediction means for predicting a collision direction of the opponent vehicle with respect to the own vehicle.

The vehicle data storage section 26 stores vehicle data constituted by sizes of the own vehicle, which specifically are distances from the rear wheel center to the front face and left and right side faces. The vehicle data storage section 26 outputs a vehicle data signal concerning the stored vehicle data to the collision surface determination computing section 27, collision determining section 31, and collision position computing section 32.

According to the just before collision angle signal issued from the just before collision angle computing section 24, the approaching direction signal issued from the vehicle approaching direction determination computing section 25, and the vehicle data signal issued from the vehicle data storage section 26, the collision surface determination computing section 27 determines by a computation a collision surface which is a surface of the own vehicle where the opponent vehicle is predicted to collide. While any of the front face and left and right side faces may become the collision surface, the collision surface determination computing section 27 selects and determines the collision surface from these faces. The collision surface determination computing section 27 outputs a collision surface signal concerning the determined collision surface to the collision position computing section 32. The collision surface determination computing section 27 constitutes collision surface selection means in the present invention.

According to the transformed opponent vehicle signal issued from the coordinate transforming section 21 and the estimated curve radius signal issued from the estimated curve radius computing section 22, the vehicle track computing section 28 calculates running tracks of the own vehicle and opponent vehicle by a computation. The vehicle track computing section 28 outputs a vehicle track signal concerning the calculated running tracks of the own vehicle and opponent vehicle to the track intersection computing section 29 and reaching/passing time computing section 30. The vehicle track computing section 28 constitutes running track prediction means of the present invention for predicting the running track of the own vehicle.

According to the vehicle track signal issued from the vehicle track computing section 28, the track intersection computing section 29 calculates by a computation a track intersection which is an intersection between the own vehicle and opponent vehicle. The track intersection computing section 29 outputs a track intersection signal concerning the calculated track intersection to the collision determining section 31. The track intersection computing section 29 constitutes positional relationship detection means for detecting the positional relationship between the own vehicle and opponent vehicle.

According to the vehicle speed signal issued from the own vehicle speed computing section 23 and the vehicle track signal issued from the vehicle track computing section 28, the reaching/passing time computing section 30 calculates by a computation a reaching time which is a time when the own vehicle reaches each point on the track where it runs and a passing time when it passes each point. The reaching/passing time computing section 30 outputs a reaching/passing time signal concerning the calculated reaching time and passing time to the collision determining section 31. The reaching/passing time computing section 30 constitutes time calculation means for calculating times when the own vehicle and the collision candidate moving body reach and pass an intersection between the selected collision surface and the running track of the collision candidate moving body.

According to the track intersection signal issued from the track intersection computing section 29, the reaching/passing time signal issued from the reaching/passing time computing section 30, and the vehicle data signal issued from the vehicle data storage section 26, the collision determining section 31 performs collision determination. The collision determining section 31 outputs a collision determination signal concerning the result of the collision determination to the collision position computing section 32 together with the track intersection signal issued from the track intersection computing section 29, the reaching/passing time signal issued from the reaching/passing time computing section 30, and the vehicle data signal.

According to the collision surface signal issued from the collision surface determination computing section 27, the collision determination signal issued from the collision determining section 31, the track intersection signal, the reaching/passing time signal issued from the reaching/passing time computing section 30, and the vehicle data signal issued from the vehicle data storage section 26, the collision position computing section 32 calculates by a computation a position of the own vehicle where the opponent vehicle collides. According to the collision position, the collision position computing section 32 generates and outputs a deceleration signal to the brake ECU 7, and actuation signals to the airbag actuator 8 and seatbelt actuator 9. The collision position computing section 32 constitutes collision position calculation means for predicting a collision direction of the collision candidate moving body with respect to the own vehicle.

Figure 3:
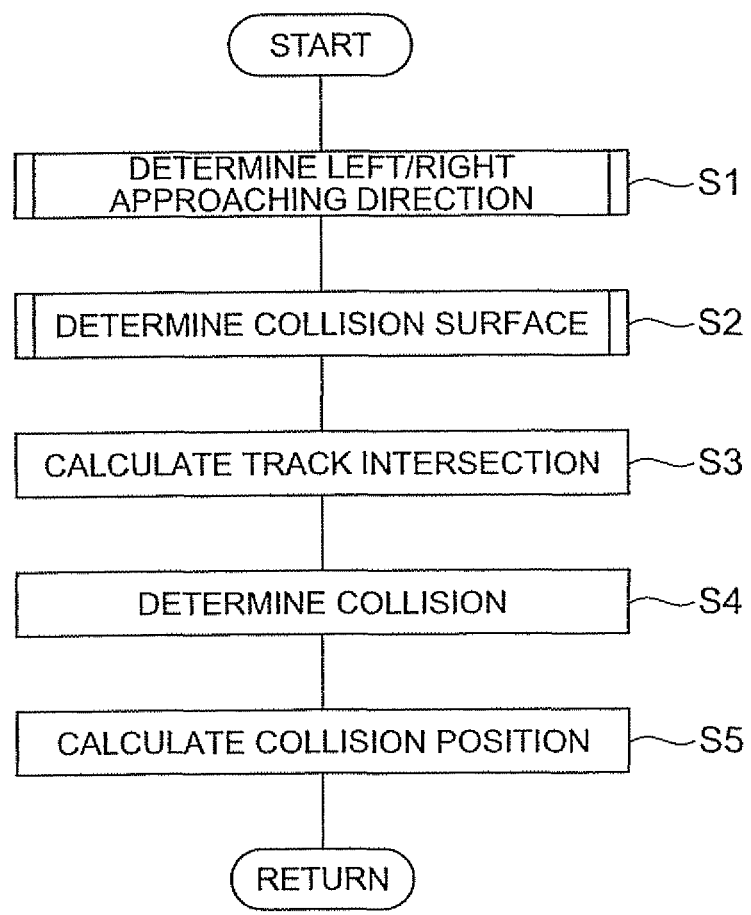
FIG. 3 is a flowchart illustrating a first control process of the collision prediction apparatus.
Figure 4:
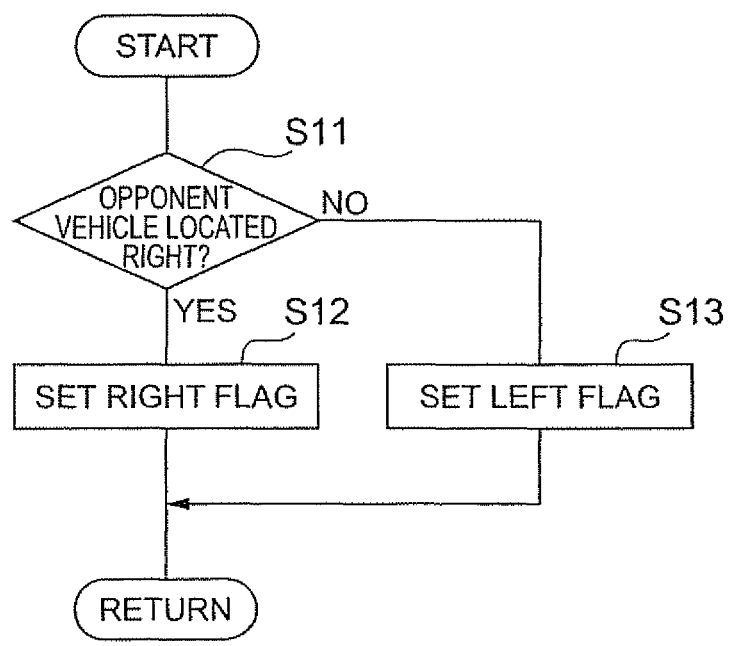
FIG. 4 is a flowchart illustrating a procedure of left/right approaching direction determination.
Figure 5:
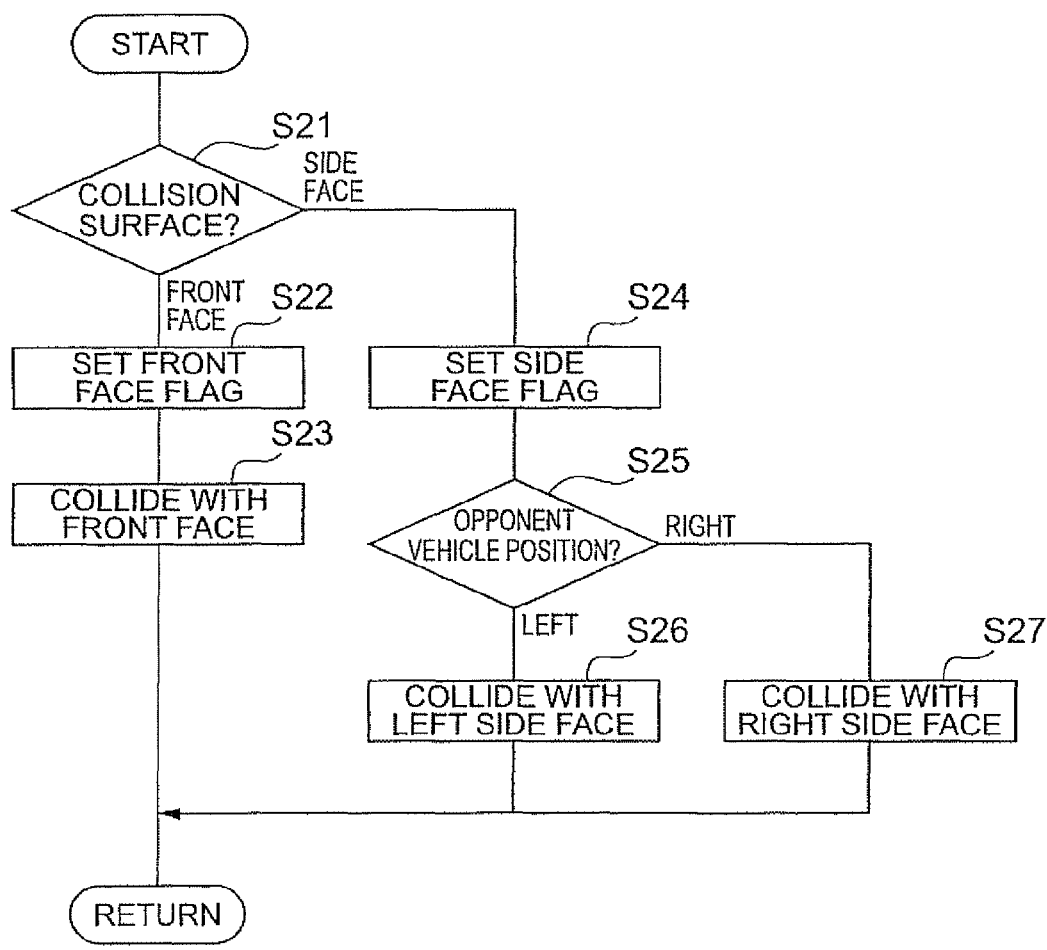
FIG. 5 is a flowchart illustrating a procedure of a collision surface determination process.

A first control procedure of the collision prediction apparatus in accordance with this embodiment will now be explained. FIGS. 3 to 5 are flowcharts illustrating the first control procedure of the collision prediction apparatus in accordance with this embodiment. As illustrated in FIG. 3, the collision prediction ECU 2 in the collision prediction apparatus in accordance with this embodiment initially performs the calculation of the position and vehicle speed of the opponent vehicle in the coordinate transforming section 21, the estimation of the estimated curve radius in the estimated curve radius computing section 22, and the calculation of the own vehicle speed in the own vehicle speed computing section 23 according to the signals issued from the sensors.

Figure 7:
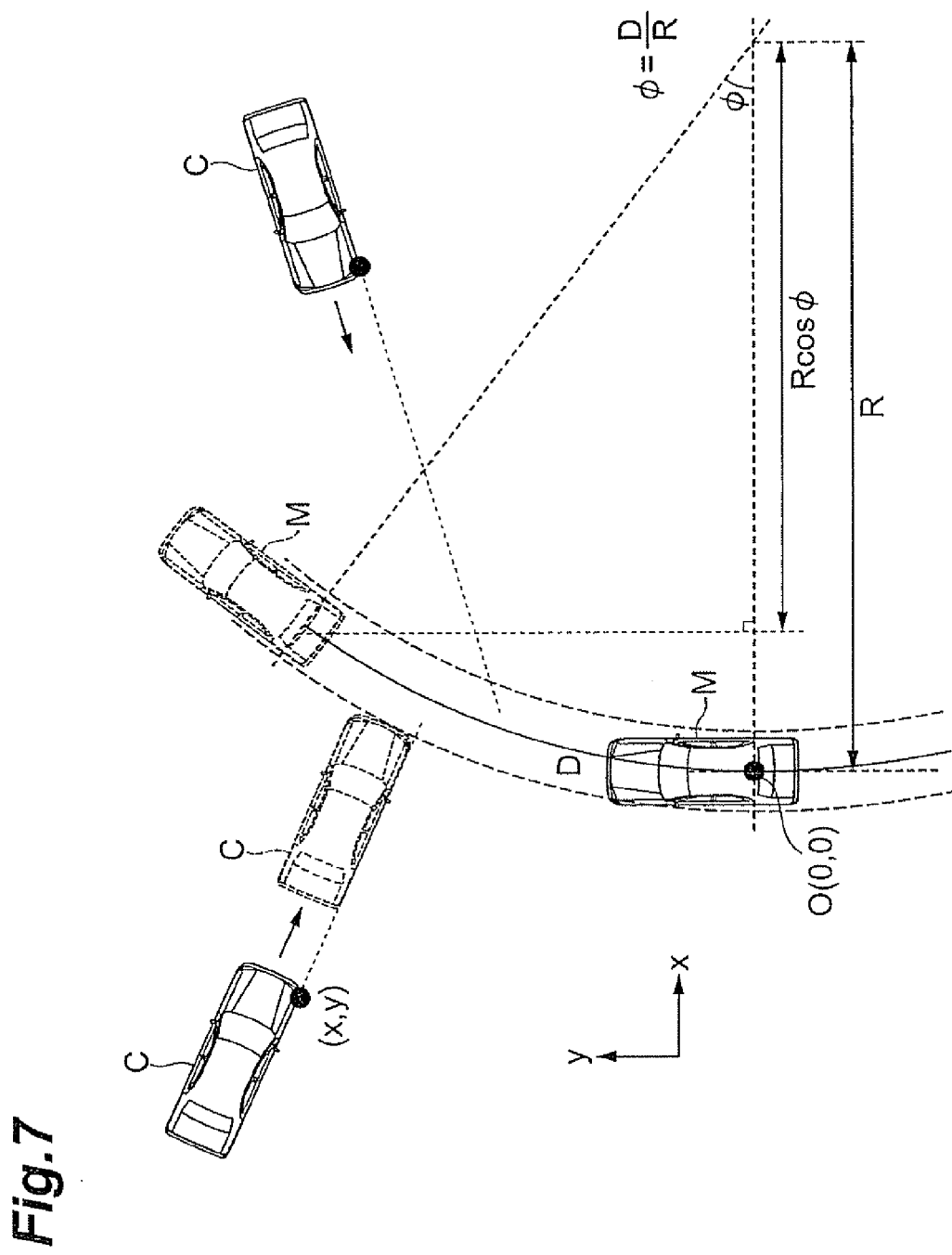
FIG. 7 is an explanatory view explaining a positional relationship between an own vehicle and an opponent vehicle.

Then, a left/right approaching direction determination process is carried out (S1). The left/right approaching direction determination process is performed in the vehicle approaching direction determination computing section 25 according to the opponent vehicle signal issued from the coordinate transforming section 21 and the estimated curve radius signal issued from the estimated curve radius computing section 22. The vehicle approaching direction determination process is carried out along the flowchart illustrated in FIG. 4. First, it is determined whether or not the opponent vehicle is located on the right side as seen from the own vehicle (S11). Whether or not the opponent vehicle is located on the right side as seen from the own vehicle can be determined by using the following expression (1), such that the opponent vehicle is on the right side when the following expression (1) holds. FIG. 7 illustrates relationships between the values used in expression (1). The example illustrated in FIG. 7 represents a state where the opponent vehicle C is located on the left or right side of the own vehicle M.

$$x > R - R \cos \phi = R\{1 - [1 - (1 \cdot D^2)/(2! \cdot R^2)]\} \approx y^2/2R \quad (1)$$

where
x is the x-coordinate of the opponent vehicle position;
y is the y-coordinate of the opponent vehicle position;
R is the estimated curve radius of the own vehicle;
D is the running distance of the own vehicle; and
$\phi$ is the angle (=D/R) that advances when the own vehicle travels from the current position to the collision position.

Figure 6:
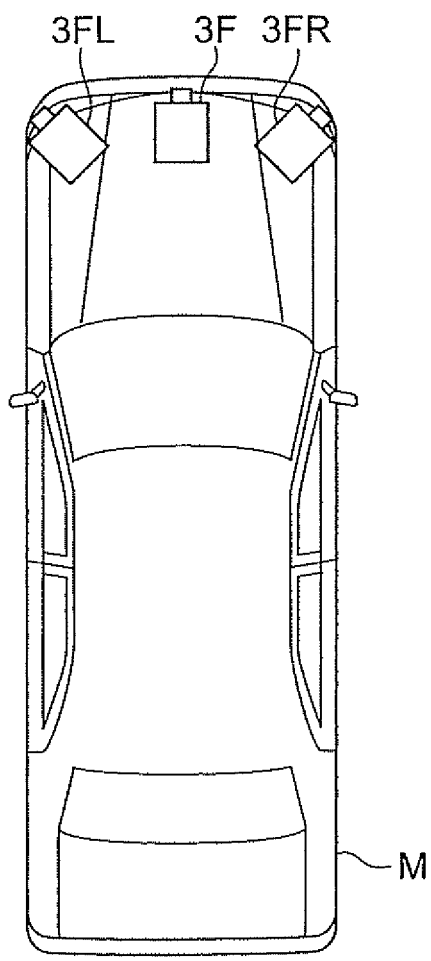
FIG. 6 is a plan view illustrating an arrangement of millimeter-wave radar sensors in a vehicle.

Here, as illustrated in FIG. 6, the vehicle M is provided with three millimeter-wave radar sensors 3F, 3FL, 3FR, so as to detect opponent vehicles at left and right positions in front of the vehicle M. Positions of the opponent vehicles are detected according to reflected wave signals from the three millimeter-wave radar sensors 3F, 3FL, 3FR. On the other hand, the collision prediction ECU 2 carries out a collision prediction while using a rear wheel axle center O of the own vehicle M as an origin. Therefore, the position of an opponent vehicle included in an opponent vehicle signal generated from the reflected wave signals is transformed by the coordinate transforming section 21 into coordinates using the rear wheel axle center O as the origin and setting the advancing direction of the own vehicle M parallel to the y axis, so that the coordinates of the opponent vehicle after the transformation are defined as (x, y). The above-mentioned expression (1) is obtained by neglecting high-order expressions in the Taylor expansion while assuming that the angle $\phi$ advancing when the own vehicle travels from the current position to the collision position is very small.

When the opponent vehicle is located on the right side as seen from the own vehicle as a result of determining whether it is or not, a right flag is set as a left/right approaching flag (S12), and the left/right approaching direction determination process is terminated. When determined not right (determined left), a left flag is set as the left/right approaching flag (S13), and the left/right approaching direction determination process is terminated.

Figure 8:
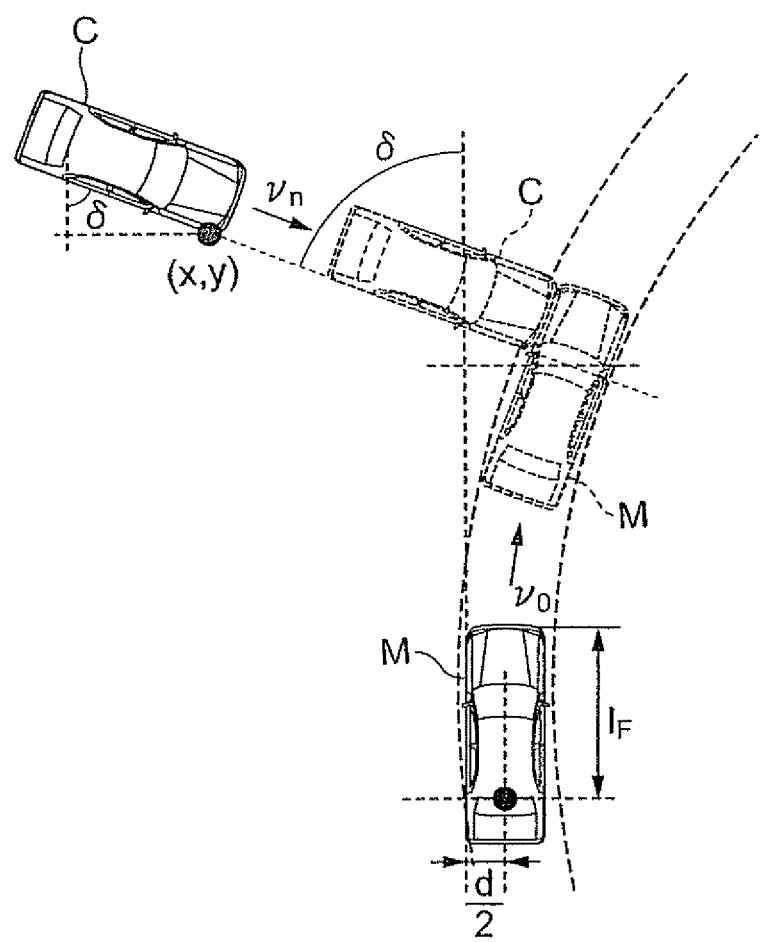
FIG. 8 is an explanatory view explaining a positional relationship between the own vehicle and opponent vehicle when determining a collision surface.

After completing the left/right approaching direction determination, a collision surface determination process is carried out (S2). The collision surface determination process is performed in the collision surface determination computing section 27 according to the just before collision angle signal issued from the just before collision angle computing section 24 and the approaching direction signal issued from the vehicle approaching direction determination computing section 25. As for data such as the width of the own vehicle, values issued from the vehicle data storage section 26 are used. The collision surface determination process is carried out along the flowchart illustrated in FIG. 5. First, it is determined whether the collision surface is the front face or a side face (S21). Whether the collision surface is the front face or a side face can be determined by using the following expression (2), such that the collision surface is the front face when the following expression (2) holds. FIG. 8 illustrates relationships between the values used in expression (2). Here, the just before collision angle calculated in the just before collision angle computing section 24 refers to an angle formed between the advancing direction of the own vehicle M and the advancing direction of the opponent vehicle C.

$$\frac{\left|x - \frac{y^2}{2R}\right| - \frac{d}{2} \cdot \frac{1}{\sin\delta}}{v_n \sin\delta} < \frac{y - l_F}{v_0 + v_n \cos\delta} \begin{pmatrix} v_0 + v_n \cos\delta \neq 0 \\ \sin\delta = 0 \end{pmatrix} \quad (2)$$

where
d is the width of the own vehicle;
$\delta$ is the just before collision angle;
$v_n$ is the opponent vehicle speed;
$v_0$ is the own vehicle speed; and
$l_F$ is the length from the rear wheel axle center of the own vehicle to its front face.

The front face is determined to be the collision surface when sin $\delta$=0, whereas a side face is determined to be the collision surface when $v_0+v_n \cos \delta$=0. When the above-mentioned expression (2) holds as a result of the determination using expression (2), the front face is determined to be the collision surface, and a front face flag is set as an own vehicle collision flag (S22). Then, it is determined that the opponent vehicle will collide with the front face of the own vehicle (S23), and the collision surface determination process is terminated.

When it is determined that the above-mentioned expression (2) does not hold, the collision surface is determined to be a side face, and a side face flag is set as the own vehicle collision flag (S24). Then, it is determined whether the opponent vehicle approaches from the left or right (S25). Whether the opponent vehicle approaches from the left or right is determined by referring to the left/right approaching flag and finding whether the set flag is the left flag or right flag.

When it is determined that the left flag is set and the opponent vehicle approaches from the left side as a result, the opponent vehicle is assumed to collide with the left side face of the own vehicle (S26), and the collision surface determination process is terminated. When it is determined that the opponent vehicle approaches from the right side, the opponent vehicle is assumed to collide with the right side face of the own vehicle (S27), and the collision surface determination process is terminated.

Figure 9:
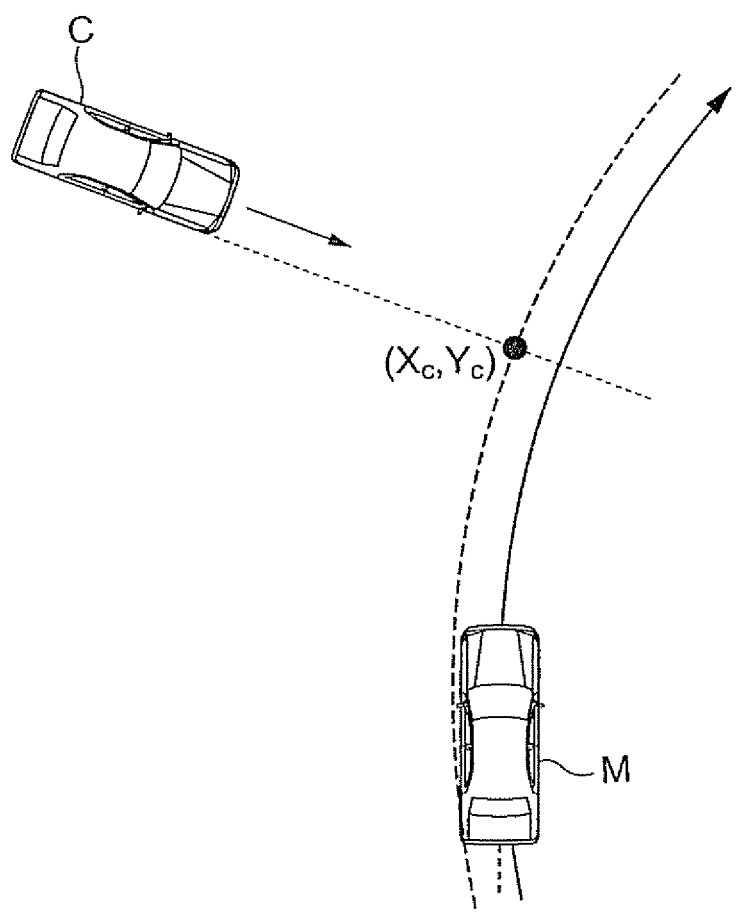
FIG. 9 is an explanatory view explaining a positional relationship between the own vehicle and opponent vehicle when calculating tracks of the own vehicle and opponent vehicle.

After completing the collision surface determination process, the track of the own vehicle and the track of the opponent vehicle are determined by the vehicle track computing section 28, and the intersection between the track of the own vehicle and the track of the opponent vehicle is calculated by the track intersection computing section 29 (S3). Here, the track of the own vehicle is represented by expression (3) having a numerical relationship illustrated in FIG. 9, while the track of the opponent vehicle is represented by expression (4).

$$(X-X_g)^2+(Y+Y_g)^2=R_{gL}^2 \quad (3)$$

$$p_n X + q_n Y + r_n = 0 \quad (4)$$

where
- $X_g$ is the X-coordinate of the own vehicle position;
- $Y_g$ is the Y-coordinate of the own vehicle position;
- $R_{gL}$ is the turning radius of the own vehicle; and
- $p_n$, $q_n$, and $r_n$ are constants.

The above-mentioned constants $p_n$, $q_n$, and $r_n$ can be set by values learned in the past.

Finding the intersection (X, Y) in expressions (3) and (4) can determine the intersection between the own vehicle and opponent vehicle.

After determining the intersection between the own vehicle and the opponent vehicle, the collision determining section 31 carries out collision determination of whether or not the own vehicle and the opponent vehicle collide with each other at the intersection (S4). The collision determination is performed by comparing respective times for the own vehicle and the opponent vehicle to reach their intersection. Here, it will be sufficient if the collision determination is performed for only the collision surface determined by step S2. Thus, the collision determination is not necessary for the two items determined to be no collision surface among the front and both side faces, whereby the computational load is reduced accordingly.

Thereafter, the collision position computing section 32 calculates the collision position of the own vehicle with the opponent vehicle (S5). Only the surface determined to be the collision surface is required to calculate the collision position, whereby the computational load can be reduced accordingly in this regard as well.

After calculating the collision position, an acceleration signal and actuation signals are generated according to the collision position. Then, the collision position computing section 32 outputs the deceleration signal to the brake ECU 7, and the actuation signals to the airbag actuator 8 and seatbelt actuator 9. Thus, the collision prediction is terminated.

As above, the collision prediction apparatus in accordance with this embodiment carries out the collision determination after determining the collision surface of the own vehicle with the opponent vehicle. This can reduce the amount of computations when performing the collision prediction, thereby alleviating the computational load accordingly.

Figure 10:
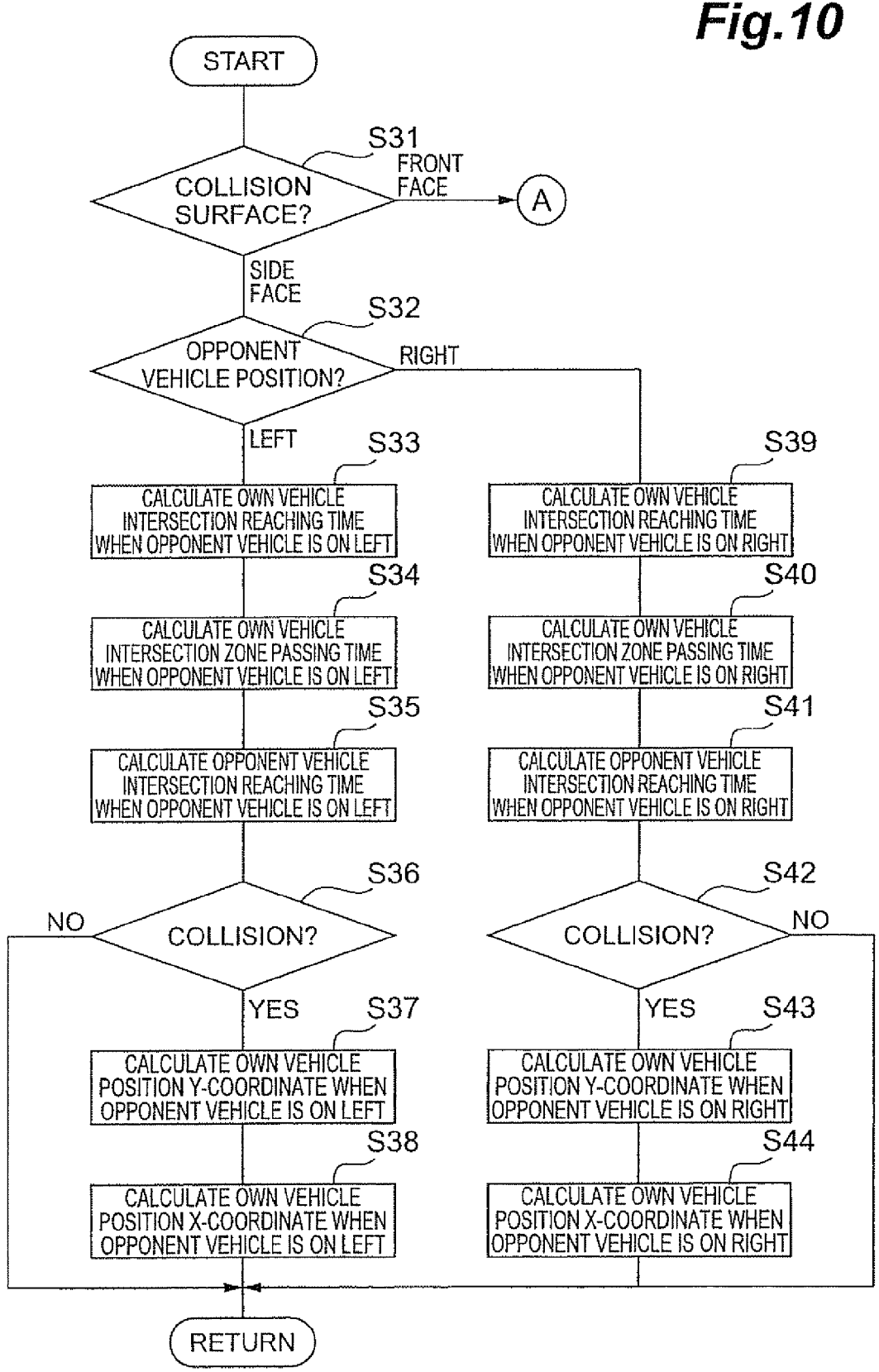
FIG. 10 is a flowchart illustrating a second control procedure in the collision prediction apparatus.
Figure 11:
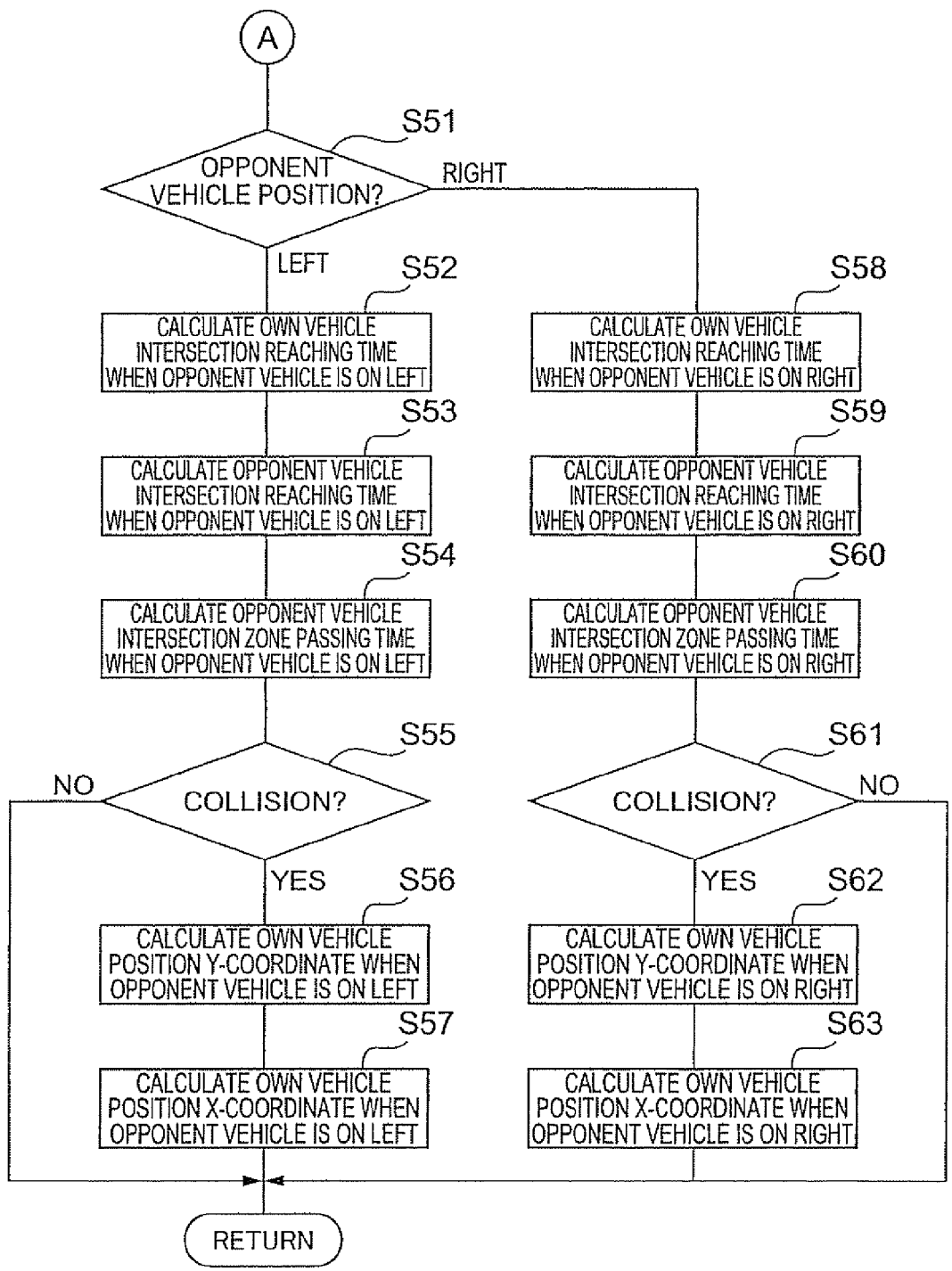
FIG. 11 is a flowchart illustrating a control procedure subsequent to FIG. 10.

A second control procedure of the collision prediction apparatus in accordance with the present invention will now be explained. The second control procedure differs from the first control procedure in that the collision determination and collision position calculation are carried out in the following manner instead of the collision determination in step S4 and collision position calculation in step S5 in FIG. 3. In the other points, the second control procedure is the same as the above-mentioned first control procedure. The differences will now be explained with reference to FIGS. 10 and 11. FIGS. 10 and 11 are flowcharts illustrating the second control procedure in the collision prediction apparatus.

As illustrated in FIG. 10, the collision prediction apparatus in accordance with this embodiment determines whether the collision surface is the front face or a side face according to the above-mentioned expression (2) explained in the first embodiment (S31). When the collision surface is determined to be a side face as a result, it is determined whether the opponent vehicle position is left or right according to the above-mentioned expression (1) (S32). When the opponent vehicle position is determined to be on the left as a result, the following process is carried out.

Here, from the results of determination in steps S31 and S32, it is assumed that the collision surface where the opponent vehicle collides is a side face of the own vehicle and that the opponent vehicle approaches the own vehicle from the left side. In this case, the own vehicle is supposed to reach the intersection between the own vehicle and opponent vehicle earlier, and pass the intersection when the opponent vehicle reaches the intersection.

Figure 12:
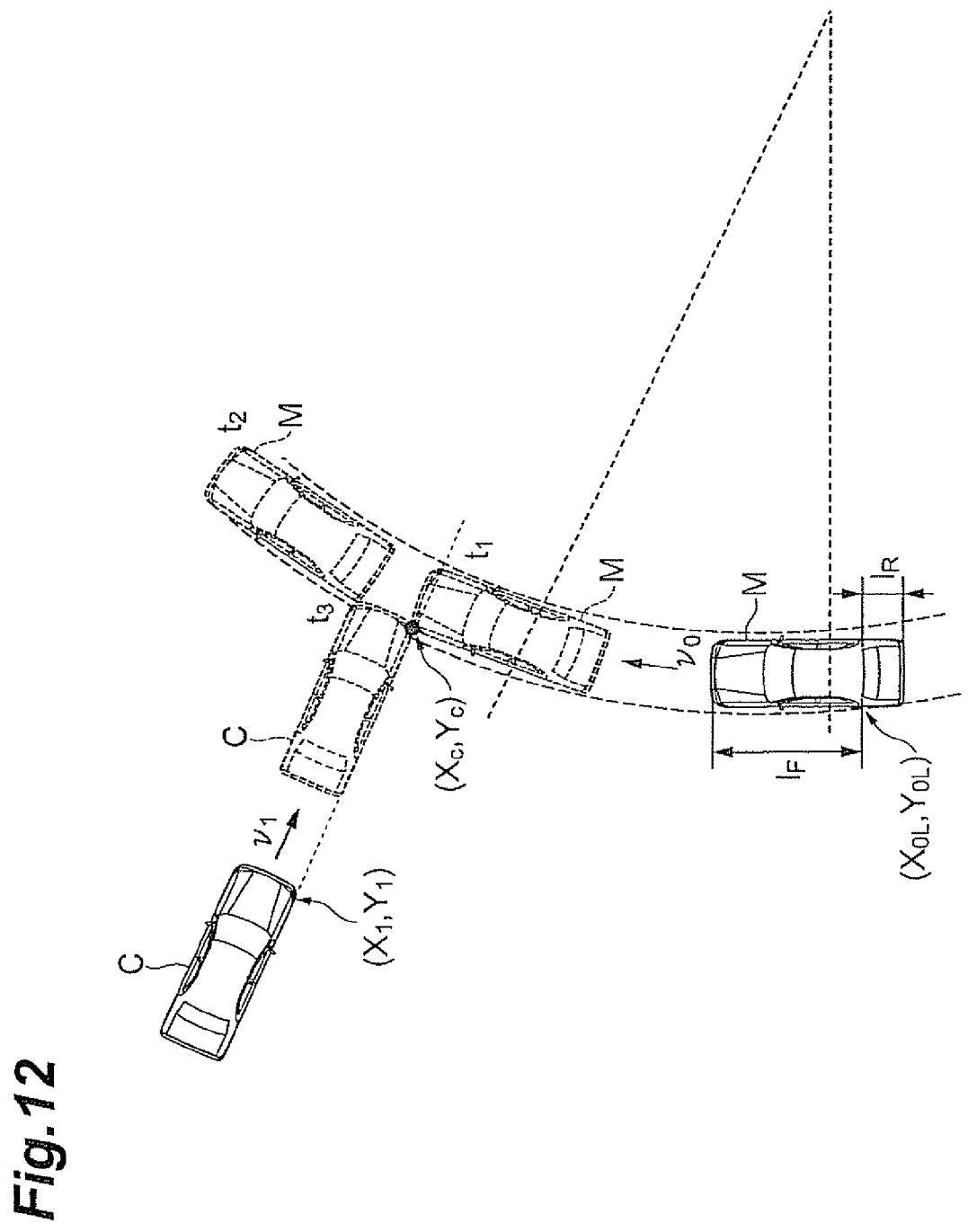
FIG. 12 is an explanatory view explaining a positional relationship between the own vehicle and opponent vehicle when the opponent vehicle positioned on the left side collides with the front face of the own vehicle.

Therefore, when calculating the collision position, a time $t_1$ required for the own vehicle to reach the intersection with the opponent vehicle is calculated according to the following expression (5) (S33). Then, a time $t_2$ during when the own vehicle passes a collision zone including the intersection with the opponent vehicle is calculated according to the following expression (6) (S34). Further, a time $t_3$ required for the opponent vehicle to reach the intersection with the own vehicle is calculated according to the following expression (7) (S35). FIG. 12 illustrates relationships between the values used in expressions (5) to (7). The times $t_1$ to $t_6$ in FIGS. 12 to 15 represent respective times when the own vehicle. M or opponent vehicle C reaches the depicted positions.

$$t_1 = \frac{\sqrt{(X_{0L} - X_C)^2 + (Y_{0L} - Y_C)^2} - l_F}{v_0} \quad (5)$$

$$t_2 = \frac{\sqrt{(X_{0L} - X_c)^2 + (Y_{0L} - Y_c)^2} + d_m + l_R}{v_0} \quad (6)$$

$$t_3 = \frac{\sqrt{(X_1 - X_c)^2 + (Y_1 - Y_c)^2}}{v_1} \quad (7)$$

After thus computing the reaching and passing times, collision determination of whether the own vehicle and opponent vehicle collide with each other or not is carried out (S36). The collision determination can be performed by determining whether the following expression (8) holds or not.

$$t_1 \leq t_3 \leq t_2 \quad (8)$$

When expression (8) does not hold as a result, it is determined that the own vehicle and opponent vehicle do not collide with each other, and the collision prediction is terminated. When expression (8) holds, on the other hand, $t_3$ is taken as the collision time, and a y-coordinate cp of the collision position of the own vehicle with the opponent vehicle is calculated by the following expression (9-1) (S37). The collision position herein is determined as a point on coordinates using the center position in the width direction in the front face of the own vehicle as an origin, the longitudinal direction (advancing direction) of the own vehicle as a cp axis, and the width direction of the own vehicle as a $cp_x$ axis. Here, the advancing direction and rightward direction of the vehicle are defined as positive directions of the cp and $cp_x$ axes, respectively.

$$cp = -(v_0 \cdot t_3 - \sqrt{(X_{0L}-X_c)^2+(Y_{0L}-Y_c)^2}+l_F) \quad (9\text{-}1)$$

Then, an x-coordinate $cp_x$ of the collision position of the own vehicle with the opponent vehicle is calculated according to the following expression (9-2) (S38).

$$cp_x = d/2 \quad (9\text{-}2)$$

After calculating the collision position, a deceleration signal and actuation signals are generated according to the collision position. Then, the collision position computing section 32 outputs the deceleration signal to the brake ECU 7, and the actuation signals to the airbag actuator 8 and seatbelt actuator 9, and the collision prediction is terminated.

Figure 13:
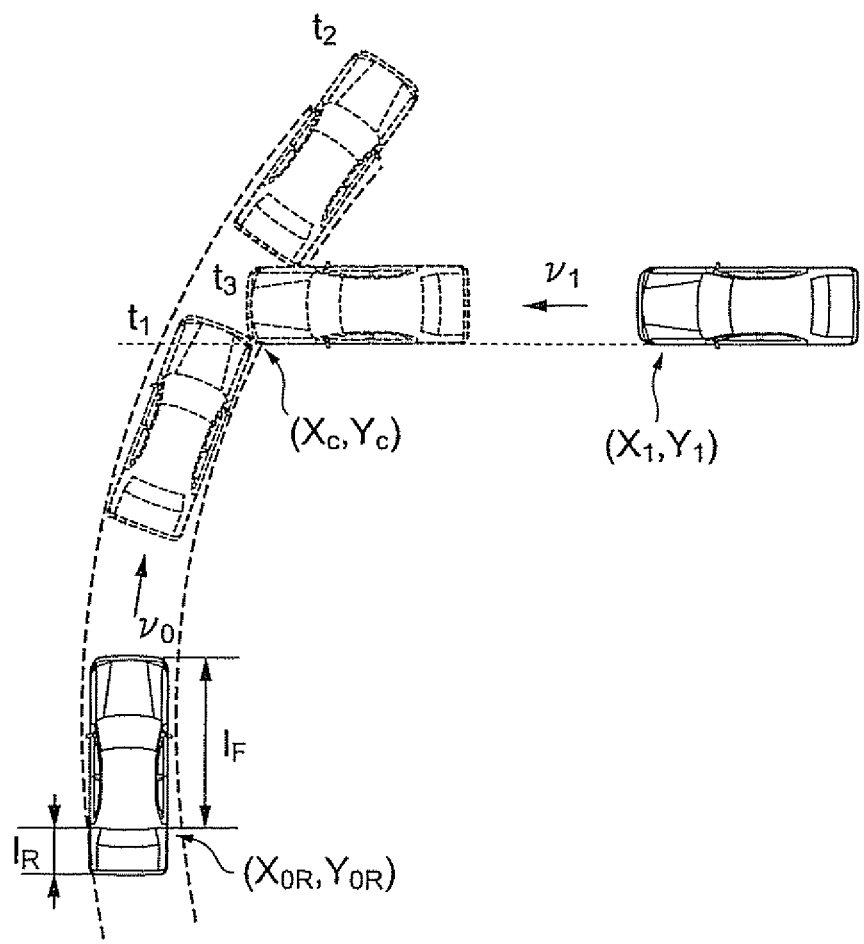
FIG. 13 is an explanatory view explaining a positional relationship between the own vehicle and opponent vehicle when the opponent vehicle positioned on the right side collides with the front face of the own vehicle.

When the opponent vehicle is determined to be on the right in step S32, on the other hand, a time $t_1$ required for the own vehicle to reach the intersection with the opponent vehicle is calculated according to the following expression (10) (S39). Then, a time $t_2$ during when the own vehicle passes the intersection with the own vehicle is calculated according to the following expression (11) (S40). Further, a time $t_3$ required for the opponent vehicle to reach the intersection with the own vehicle is calculated according to the following expression (12) (S41). FIG. 13 illustrates relationships between the values used in expressions (10) to (12).

$$t_1 = \frac{\sqrt{(X_{0R} - X_c)^2 + (Y_{0R} - Y_c)^2} - l_F}{v_0} \quad (10)$$

$$t_2 = \frac{\sqrt{(X_{0R} - X_c)^2 + (Y_{0R} - Y_c)^2} + d_m + l_R}{v_0} \quad (11)$$

$$t_3 = \frac{\sqrt{(X_1 - X_c)^2 + (Y_1 - Y_c)^2}}{v_1} \quad (12)$$

After thus calculating the reaching and passing times, collision determination of whether the own vehicle and opponent vehicle collide with each other or not is carried out (S42). The collision determination can be performed by determining whether the following expression (13) holds or not.

$$t_1 \leq t_3 \leq t_2 \quad (13)$$

When expression (13) does not hold as a result, it is determined that the own vehicle and opponent vehicle do not collide with each other, and the collision prediction is terminated. When expression (13) holds, on the other hand, $t_3$ is taken as the collision time, and a y-coordinate cp of the collision position of the own vehicle with the opponent vehicle is calculated by the following expression (14-1) (S43).

$$cp = -(v_0 \cdot t_3 - \sqrt{(X_{0R} - X_c)^2 + (Y_{0R} - Y_c)^2} + l_F) \quad (14\text{-}1)$$

Then, an x-coordinate $cp_x$ of the collision position of the own vehicle with the opponent vehicle is calculated according to the following expression (14-2) (S44).

$$cp_x = d/2 \quad (14\text{-}2)$$

After calculating the collision position, a deceleration signal and actuation signals are generated according to the collision position. Then, the collision position computing section 32 outputs the deceleration signal to the brake ECU 7, and the actuation signals to the airbag actuator 8 and seatbelt actuator 9, and the collision prediction is terminated.

When the front surface is determined to be the collision surface in step S31, the process proceeds to the flow illustrated in FIG. 11, so as to determine whether or not the opponent vehicle is located on the right side as seen from the own vehicle (S51). This determination can be carried out by a procedure similar to step S1 in the first embodiment.

From the results of determination in steps S31 and S51, it is assumed that the collision surface where the opponent vehicle collides is the front face of the own vehicle and that the opponent vehicle approaches the own vehicle from the left side. In this case, the opponent vehicle is supposed to reach the intersection between the own vehicle and opponent vehicle earlier, and pass the intersection when the own vehicle reaches the intersection.

Figure 14:
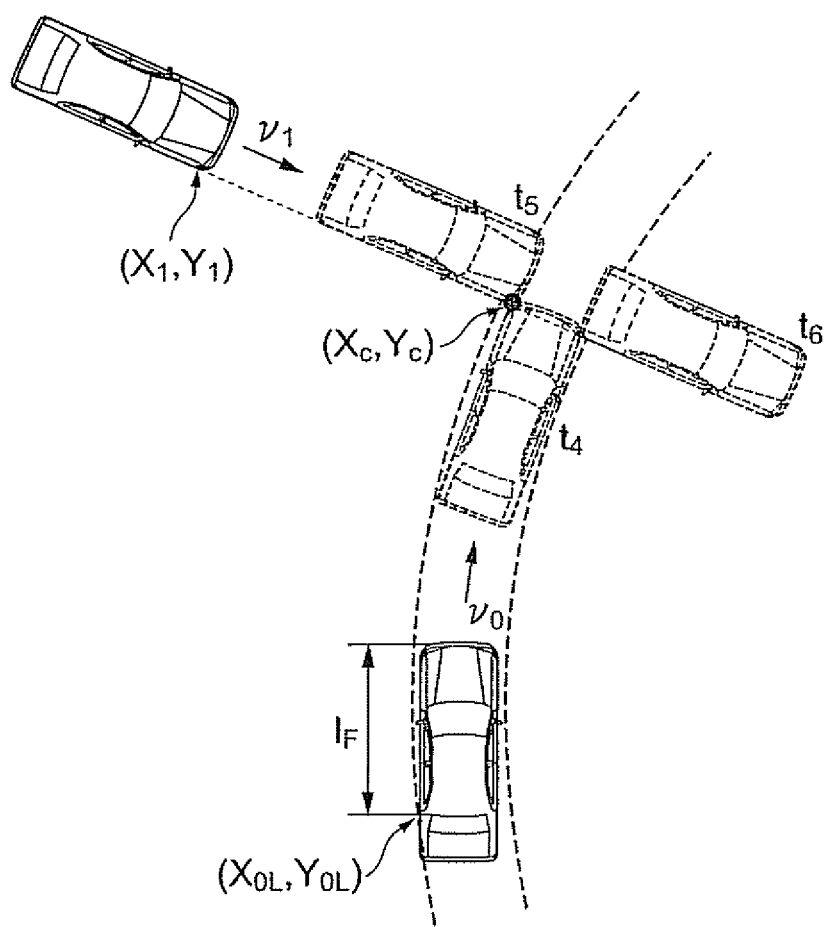
FIG. 14 is an explanatory view explaining a positional relationship between the own vehicle and opponent vehicle when the opponent vehicle positioned on the left side collides with the left side face of the own vehicle.

Therefore, when calculating the collision position, a time $t_4$ required for the own vehicle to reach the intersection with the opponent vehicle is calculated according to the following expression (15) (S52). Then, a time $t_5$ required for the opponent vehicle to reach the intersection with the own vehicle is calculated according to the following expression (16) (S53). Further, a time $t_6$ during when the opponent vehicle passes a collision zone including the intersection with the own vehicle is calculated according to the following expression (17) (S54). FIG. 14 illustrates relationships between the values used in expressions (15) to (17).

$$t_4 = \frac{\sqrt{(X_{0L} - X_c)^2 + (Y_{0L} - Y_c)^2} - l_F}{v_0} \quad (15)$$

$$t_5 = \frac{\sqrt{(X_1 - X_c)^2 + (Y_1 - Y_c)^2}}{v_1} \quad (16)$$

$$t_6 = \frac{\sqrt{(X_1 + X_c)^2 + (Y_1 + Y_c)^2} + l_m + d}{v_1} \quad (17)$$

After thus calculating the reaching and passing times, collision determination of whether the own vehicle and opponent vehicle collide with each other or not is carried out (S55). The collision determination can be performed by determining whether the following expression (18) holds or not.

$$t_5 \leq t_4 \leq t_6 \quad (18)$$

When expression (18) does not hold as a result, it is determined that the own vehicle and opponent vehicle do not collide with each other, and the collision prediction is terminated. When expression (18) holds, the y-coordinate cp is set to 0 (S56).

Then, an x-coordinate of the collision position of the own vehicle with the opponent vehicle is calculated according to the following expression (19) (S57).

$$cp_x = v_1 \cdot t_4 - \sqrt{(X_1 - X_c)^2 + (Y_1 - Y_c)^2} - \frac{d}{2} \quad (19)$$

After calculating the collision position, a deceleration signal and actuation signals are generated according to the collision position. Then, the collision position computing section 32 outputs the deceleration signal to the brake ECU 7, and the actuation signals to the airbag actuator 8 and seatbelt actuator 9, and the collision prediction is terminated.

Figure 15:
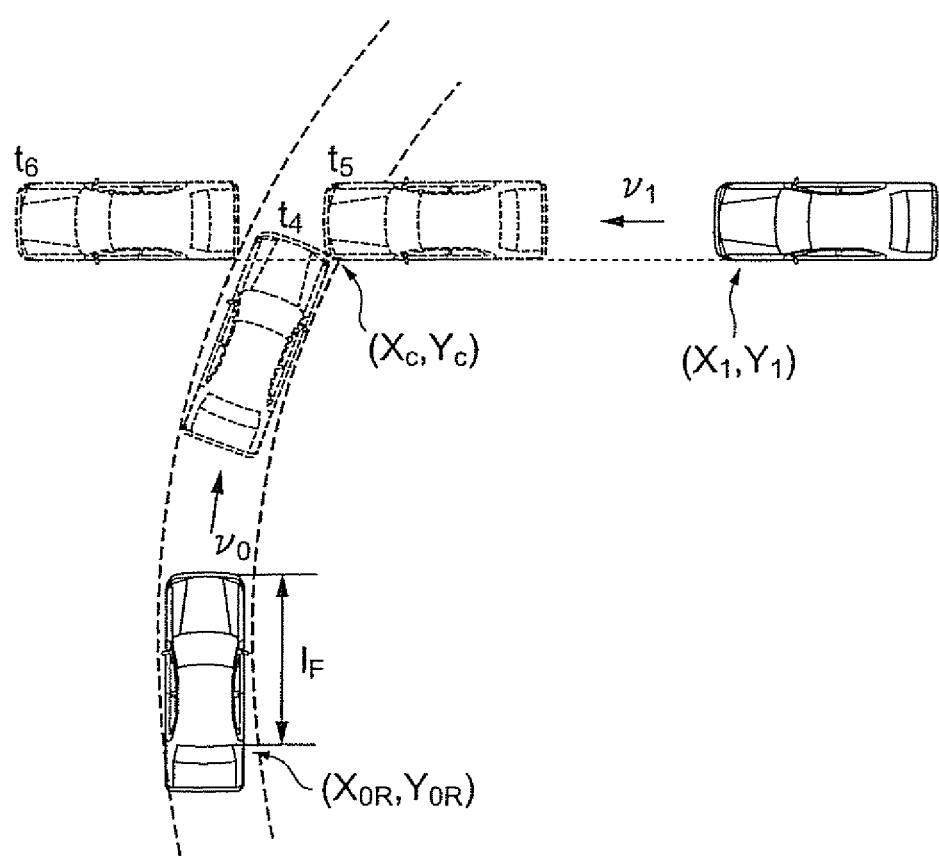
FIG. 15 is an explanatory view explaining a positional relationship between the own vehicle and opponent vehicle when the opponent vehicle positioned on the right side collides with the right side face of the own vehicle.

When the opponent vehicle is determined to be located on the right side in step S51, a time $t_4$ required for the own vehicle to reach the intersection with the opponent vehicle is calculated according to the following expression (20) (S58). Then, a time $t_5$ required for the opponent vehicle to reach the intersection with the own vehicle is calculated according to the following expression (21) (S59). Further, a time $t_6$ during when the opponent vehicle passes a collision zone including the intersection with the own vehicle is calculated according to the following expression (22) (S60). FIG. 15 illustrates relationships between the values used in expressions (20) to (22).

$$t_4 = \frac{\sqrt{(X_{0R} - X_c)^2 + (Y_{0R} - Y_c)^2} - l_F}{v_0} \tag{20}$$

$$t_5 = \frac{\sqrt{(X_1 - X_c)^2 + (Y_1 - Y_c)^2}}{v_1} \tag{21}$$

$$t_6 = \frac{\sqrt{(X_1 - X_c)^2 + (Y_1 - Y_c)^2} + l_m + d}{v_1} \tag{22}$$

After thus calculating the reaching and passing times, collision determination of whether the own vehicle and opponent vehicle collide with each other or not is carried out (S61). The collision determination can be performed by determining whether the following expression (23) holds or not.

$$t_5 \le t_4 \le t_6 \tag{23}$$

When expression (23) does not hold as a result, it is determined that the own vehicle and opponent vehicle do not collide with each other, and the collision prediction is terminated. When expression (23) holds, the y-coordinate cp is set to 0 (S62).

Then, an x-coordinate of the collision position of the own vehicle with the opponent vehicle is calculated according to the following expression (24) (S63)

$$cp_x = -\left(v_1 \cdot t_4 - \sqrt{(X_1 - X_c)^2 + (Y_1 - Y_c)^2} - \frac{d}{2}\right) \tag{24}$$

After calculating the collision position, a deceleration signal and actuation signals are generated according to the collision position.

Then, the collision position computing section 32 outputs the deceleration signal to the brake ECU 7, and the actuation signals to the airbag actuator 8 and seatbelt actuator 9, and the collision prediction is terminated.

Thus, the collision prediction in accordance with this embodiment determines the reaching and passing times used for the collision determination according to the collision surface of the own vehicle with the opponent vehicle and the approaching direction of the opponent vehicle. Here, it is determined to use the time when the own vehicle reaches the intersection and times when the opponent vehicle reaches and passes the intersection. This can decrease the reaching and passing times to be calculated, thereby reducing the amount of computations accordingly. When calculating the collision position in practice, only the position with respect to the collision surface is required to be calculated, whereby the amount of computations can be reduced accordingly. Thus, the computational load can be reduced as a whole.

Though preferred embodiments of the present invention have been explained in the foregoing, the present invention is not limited to the above-mentioned embodiments. For example, the collision candidate moving body is a vehicle in the above-mentioned embodiments but may be any of other running bodies as well.

INDUSTRIAL APPLICABILITY

The present invention can be utilized in a collision prediction apparatus for predicting a collision position of the own vehicle with a collision candidate moving body such as another vehicle.

The invention claimed is:

1. A collision prediction apparatus comprising:
    a running track prediction means for predicting a running track of an own vehicle;
    an estimated curve radius means for estimating a curve radius of the own vehicle based on a real-time parameter of the own vehicle;
    a positional relationship detection means for detecting a relative positional relationship between a collision candidate moving body and the own vehicle;
    a collision direction prediction means for predicting a collision direction of the collision candidate moving body with respect to the own vehicle based on the estimated curve radius calculated by the estimated curve radius computing unit;
    a collision surface selection means for selection a collision surface from a plurality of collision surfaces of the own vehicle with the collision candidate moving body according to the predicted collision direction of the collision candidate moving body with respect to the own vehicle predicted by the collision direction prediction means;
    a collision position calculation means for calculating, after the collision surface selection means selects the collision surface, a collision position of the own vehicle with the collision candidate moving body according to the selected collision surface, the predicted running track, and the relative positional relationship,
    wherein only the collision position corresponding to the selected collision surface is calculated in order to reduce a computational load on the collision position calculation means;
    the collision position calculation means for generating and outputting a deceleration signal to a breaking means according to the calculated collision position; and
    the breaking means for actuating a break actuator according to the deceleration signal thereby controlling the deceleration of the own vehicle.

2. A collision prediction apparatus according to claim 1, wherein the collision direction prediction means predicts the collision direction according to a left/right position of the collision candidate moving body with respect to the running track of the own vehicle.

3. A collision prediction apparatus according to claim 1, further comprising:
    first time calculation means for calculating a first time when the own vehicle reaches an intersection between the selected collision surface and a running track of the collision candidate moving body;
    second time calculation means for calculating a second time when the own vehicle passes the intersection between the selected collision surface and the running track of the collision candidate moving body; and
    third time calculation means for calculating a third time when the collision candidate moving body reaches the intersection between the selected collision surface and the running track of the collision candidate moving body;
    wherein the third time is taken as a predicted collision time when the third time is later than the first time but earlier than the second time, and the collision position is predicted according to the predicted collision time.

4. A collision prediction apparatus according to claim 1, further comprising:
    fourth time calculation means for calculating a fourth time when the own vehicle reaches an intersection between the selected collision surface and a running track of the collision candidate moving body;

fifth time calculation means for calculating a fifth time when the collision candidate moving body reaches the intersection between the selected collision surface and the running track of the collision candidate moving body; and sixth time calculation means for calculating a sixth time when the collision candidate moving body passes the intersection between the selected collision surface and the running track of the collision candidate moving body;

wherein the fourth time is taken as a predicted collision time when the fourth time is later than the fifth time but earlier than the sixth time, and the collision position is predicted according to the predicted collision time.

5. A collision prediction apparatus according to claim 1, further comprising:

angle calculation means for calculating a just-before-collision angle that is an angle formed between an advancing direction of the own vehicle and an advancing direction of the collision candidate moving body.

6. A collision prediction apparatus according to claim 5, wherein the collision surface selection means selects the collision surface of the own vehicle with the collision candidate moving body according to the just-before-collision angle calculated by the angle calculation means.

7. A collision prediction apparatus according to claim 1, wherein:

the first time is a time when a running track intersection between a running track of the own vehicle and a running track of the collision candidate moving body is reached, and the second time is a time when the running track intersection is passed.

8. A collision prediction apparatus according to claim 1, wherein the real-time parameter is at least one of a steering angle and a yaw rate of the own vehicle.

\* \* \* \* \*